(12) United States Patent
Yamane et al.

(10) Patent No.: US 8,184,429 B2
(45) Date of Patent: May 22, 2012

(54) CAPACITOR LEAD WIRE, ITS MANUFACTURING METHOD, AND CAPACITOR USING THE SAME

(75) Inventors: Junji Yamane, Yamaguchi (JP); Hiroshi Kurimoto, Yamaguchi (JP); Kohei Harazono, Yamguchi (JP); Doyuu Hachisu, Yamaguchi (JP); Takanao Saito, Yamaguchi (JP); Hiroyuki Saikawa, Fukui (JP)

(73) Assignee: Panasonic Corporation, Osaka (JP)

( * ) Notice: Subject to any disclaimer, the term of this patent is extended or adjusted under 35 U.S.C. 154(b) by 651 days.

(21) Appl. No.: 12/375,257

(22) PCT Filed: Aug. 30, 2007

(86) PCT No.: PCT/JP2007/066833
§ 371 (c)(1),
(2), (4) Date: Jan. 27, 2009

(87) PCT Pub. No.: WO2008/029694
PCT Pub. Date: Mar. 13, 2008

(65) Prior Publication Data
US 2009/0323254 A1    Dec. 31, 2009

(30) Foreign Application Priority Data

Sep. 7, 2006 (JP) ................ 2006-242446
Nov. 28, 2006 (JP) ................ 2006-319852

(51) Int. Cl.
*H01G 4/228* (2006.01)
*H01G 4/32* (2006.01)
*H01G 9/10* (2006.01)
*H01G 9/00* (2006.01)
*H05K 5/03* (2006.01)

(52) U.S. Cl. ........ 361/520; 361/511; 361/530; 361/538; 361/540; 361/306.1

(58) Field of Classification Search ........... 361/535, 361/520, 302, 540, 306.1, 511, 538, 530
See application file for complete search history.

(56) References Cited

U.S. PATENT DOCUMENTS 3,356,913 A * 12/1967 Earley .................. 361/520
(Continued)

FOREIGN PATENT DOCUMENTS
CN         1711614       12/2005
(Continued)

OTHER PUBLICATIONS

International Search Report issued Dec. 4, 2007 in the International (PCT) Application of which the present application is the U.S. National Stage.

(Continued)

*Primary Examiner* — Jayprakash N Gandhi
*Assistant Examiner* — Arun Ramaswamy
(74) *Attorney, Agent, or Firm* — Wenderoth, Lind & Ponack, L.L.P.

(57) ABSTRACT

A capacitor is improved in reliability by suppressing the formation of burrs or protrusions at a joint portion between an aluminum wire round rod and an external terminal in a lead wire used for a capacitor. A metal cap having a higher melting point than aluminum is fitted to an end portion of the aluminum wire round rod and the metal cap is heated, thereby joining the aluminum wire round rod to the metal cap. Thereafter, the external terminal and the metal cap are welded to each other. The metal cap has a curved surface in which an outer periphery is decreased from an opening toward an end portion opposite to the opining. The opening is provided with a stepped portion, so that the sealing degree is increased when the lead wire is inserted into a hole of the sealing member.

6 Claims, 6 Drawing Sheets

U.S. PATENT DOCUMENTS

| | | | |
|---|---|---|---|
| 4,446,502 A * | 5/1984 | Boser et al. | 361/308.2 |
| 4,962,446 A | 10/1990 | Asakura et al. | |
| 7,262,953 B2 | 8/2007 | Ozawa et al. | |
| 2004/0174659 A1 | 9/2004 | Kawahara et al. | |

FOREIGN PATENT DOCUMENTS

| GB | 1 399 193 | 6/1975 |
|---|---|---|
| JP | 1-106417 | 4/1989 |
| JP | 1-164018 | 6/1989 |
| JP | 6-310385 | 11/1994 |
| JP | 6-349687 | 12/1994 |
| JP | 2002-198259 | 7/2002 |

OTHER PUBLICATIONS

Supplementary European Search Report issued Jun. 9, 2011 in EP 07 80 6310, which is a foreign counterpart to the present application.

Partial English translation of JP 1-106417, Apr. 1989.

* cited by examiner

CAPACITOR LEAD WIRE, ITS MANUFACTURING METHOD, AND CAPACITOR USING THE SAME

This application is a U.S. national phase application of PCT International Application PCT/JP2007/066833, filed Aug. 30, 2007.

TECHNICAL FIELD

The present invention relates to a lead wire used for a capacitor, a method of manufacturing the same, and a capacitor using the lead wire. More particularly, it relates to a capacitor including a sealing member provided with a through-hole allowing a lead wire to pass through.

BACKGROUND ART

Figure 11:
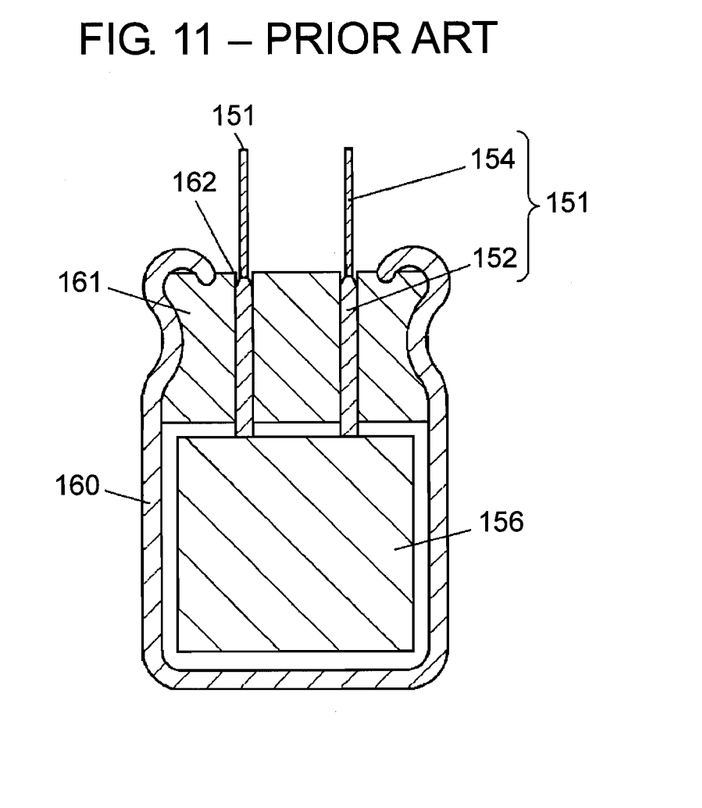
FIG. 11 is a sectional view showing a configuration of a conventional electrolytic capacitor.

FIG. 11 is a sectional view showing a conventional electrolytic capacitor. As shown in FIG. 11, lead wire 151 of a conventional electrolytic capacitor includes aluminum wire round rod 152 and external terminal 154 made of copper clad tin-plating iron wire (CP wire), which are joined to each other. Capacitor element 156 is produced by respectively connecting lead wires 151 to an anode foil and a cathode foil, which are made of valve action metal such as aluminum, and winding the anode foil and the cathode foil with a separator interposed therebetween.

Exterior case 160 is made of aluminum and has a cylindrical shape with a bottom. Exterior case 160 accommodates capacitor element 156 and an electrolyte (not shown) such as a driving electrolytic solution and a solid electrolyte of electroconductive polymer.

An open end of exterior case 160 is sealed with rubber elastic sealing member 161 having through-holes 162 through which a pair of lead wires 151 pass. Thus, an electrolytic capacitor is produced.

A method of manufacturing a conventional lead wire used for such an electrolytic capacitor includes joining aluminum wire round rod 152 and an end portion of external terminal 154 to each other by arc welding. Another method includes providing an end surface of aluminum wire round rod 152 with a hole and inserting external terminal 154 into the hole, followed by heating with a gas burner so as to join aluminum wire round rod 152 and external terminal 154 to each other.

Note here that Patent documents 1, 2 and 3 can be referred to for reference as a published document related to this application.

In such a conventional method of directly joining aluminum wire round rod 152 and CP wire of external terminal 154 by arc welding, when the diameter of aluminum wire round rod 152 is reduced and the difference between this diameter and a wire diameter of external terminal 154 is reduced, it becomes difficult to control the welding condition. Consequently, aluminum wire round rod 152 and external terminal 154 tend to be melted excessively, thus causing the formation of burrs and protrusions at the joint portion.

Such burrs and protrusions in a lead wire cause abrasion in a through-hole when a lead wire is inserted into the through-hole of a sealing member. This produces gap between the lead wire and the sealing member, resulting in leakage of a driving electrolytic solution. As a result, the reliability of an electrolytic capacitor is reduced.

Patent document 1: Japanese Patent Unexamined Publication No. H6-310385
Patent document 2: Japanese Patent Unexamined Publication No. H6-349687
Patent document 3: Japanese Patent Unexamined Publication No. 2002-19829

SUMMARY OF THE INVENTION

The present invention improves reliability of a capacitor by suppressing the occurrence of a burr and a protrusion at a joint portion. The present invention has a configuration in which a metal cap having a concave-shaped cross section is fitted to an end portion of an aluminum wire round rod.

Furthermore, a method of manufacturing a lead wire of the present invention includes fitting a metal cap having a concave-shaped cross section to an end portion of an aluminum wire round rod; and welding an outer surface of an end opposite to the opening of the metal cap and an external terminal to each other.

With the lead wire and the method of manufacturing the lead wire in accordance with the present invention, the external terminal is welded to the metal cap directly. Thereby, a metal to be joined to the external terminal can be easily selected. Therefore, it is possible to employ metals for the metal cap and the external terminal whose welding conditions for joining to each other are easily controlled. Thus, while the joint strength between the external terminal and the metal cap is kept, it is possible to suppress the occurrence of shape defects such as burrs on the surface of the metal cap.

Furthermore, since the aluminum wire round rod is fitted into a metal cap, a joint surface between the metal cap and the end portion of the aluminum wire round rod is covered with the metal cap. Therefore, it is possible to reduce a bad influence due to the joining condition of the joint surface on an appearance of the joint portion between the aluminum wire round rod and the external terminal, thus suppressing the occurrence of shape defects such as burrs.

DETAILED DESCRIPTION OF THE INVENTION

First Exemplary Embodiment

Firstly, a method of manufacturing a lead wire of the present invention is described.

FIGS. 3A, 3B, 3C and 3D are perspective views showing the steps of a joining method of a lead wire in accordance with the present invention, which sequentially shows a fitting step of fitting a metal cap having a concave-shaped cross section to an end portion of an aluminum wire round rod, and a welding step of welding an outer surface of an end opposite to the opening of the metal cap and an external terminal to each other.

Figure 3A:
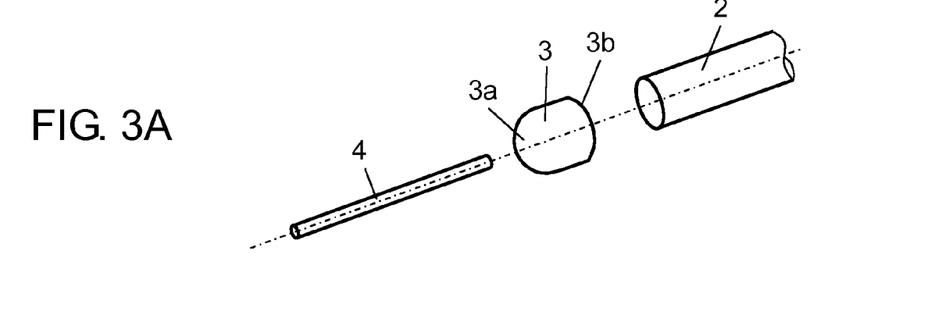
FIG. 3A is a perspective view showing a step of a joining method of the lead wire in accordance with an exemplary embodiment of the present invention.

FIG. 3A shows an initial state. Metal cap 3 is formed into a shape by press-working of a metal plate so that it has opening 3b and dome-shaped end portion 3a at an opposite side and has a concave-shaped cross section in the direction of the axis linking opening 3b to end portion 3a.

External terminal 4 is a wire or a plate of a metal-base material including an elemental substance of iron, nickel, or copper, an iron alloy, a nickel alloy, a copper alloy, and the like. Furthermore, external terminal 4 may be provided with a plating layer. As the plating layer, tin plating can be used in order to be connected to a circuit board, for example. Tin plating includes a tin (Sn) elemental substance or an alloy of tin with Ag, Bi, In, Pb and the like added.

Figure 3B:
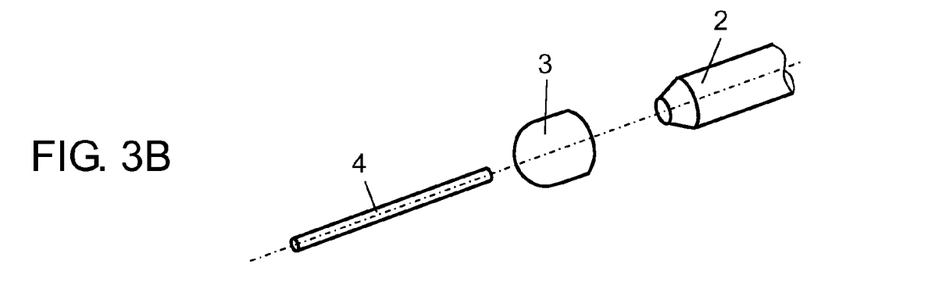
FIG. 3B is a perspective view showing a step of a joining method of the lead wire in accordance with an exemplary embodiment of the present invention.
Figure 3C:
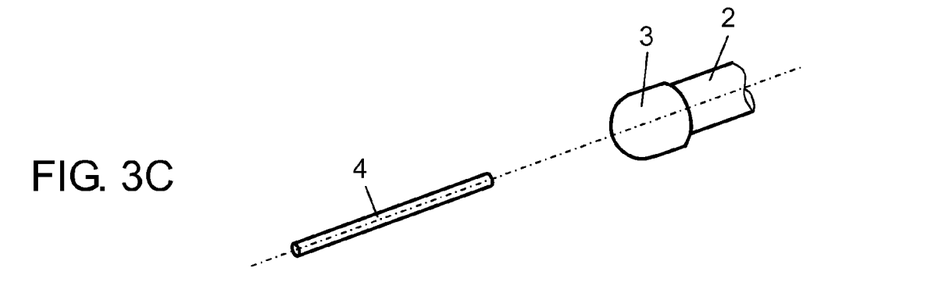
FIG. 3C is a perspective view showing a step of a joining method of the lead wire in accordance with an exemplary embodiment of the present invention.

Next, as shown in FIG. 3B, the end portion of aluminum wire round rod 2 is trimmed by press working, tumbling, or the like so that the end portion is engaged in the inner periphery of metal cap 3. Thereafter, as shown in FIG. 3C, metal cap 3 is fitted to the end portion of aluminum wire round rod 2.

Figure 3D:
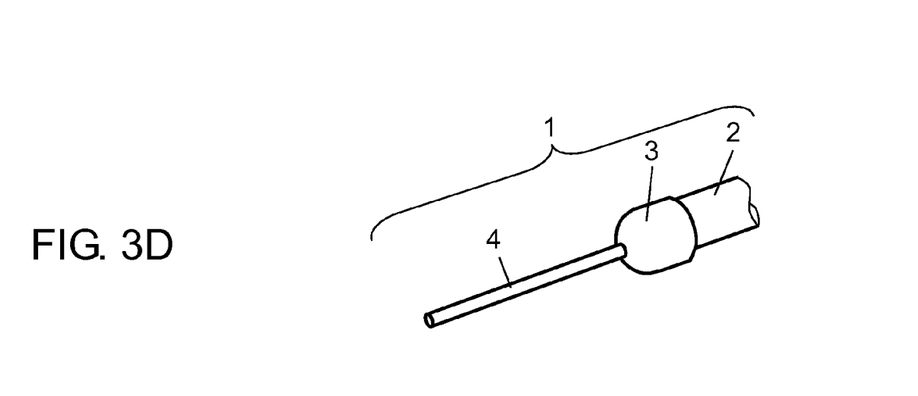
FIG. 3D is a perspective view showing a step of a joining method of the lead wire in accordance with an exemplary embodiment of the present invention.

In FIG. 3D, electrodes for welding (not shown) are connected to external terminal 4 and aluminum wire round rod 2, respectively, and external terminal 4 and metal cap 3 are joined to each other by using electric welding such as arc welding and resistance welding. Thus, aluminum wire round rod 2 is joined to the inner surface of metal cap 3 and external terminal 4 is joined to the outer surface of end portion 3a, thus forming lead wire 1.

Furthermore, as to metal cap 3, when metal cap 3 is joined to external terminal 4 by resistance welding, it is preferable that the difference in the electric resistance between metal cap 3 and external terminal 4 is small. For example, when external terminal 4 is made of an iron-base material, it is desirable that iron, nickel or an iron-nickel alloy base material is selected for metal cap 3. When external terminal 4 is made of a copper base material, it is desirable that copper or a copper alloy base material is selected for metal cap 3. Thus, while the joint strength between external terminal 4 and metal cap 3 is maintained, an effect of suppressing the occurrence of shape defects such as burrs can be improved.

Furthermore, when metal cap 3 and external terminal 4 are joined to each other by resistance welding, even if melting occurs at the join portion between metal cap 3 and aluminum wire round rod 2, it is covered with metal cap 3. Therefore, shape defects such as burrs do not occur due to the melting at the joint portion between metal cap 3 and external terminal 4.

Furthermore, the outer surface of end portion 3a of metal cap 3 may have a flat shape, thus enabling the jointing state between end portion 3a and external terminal 4 to be stabilized.

In FIGS. 3A to 3D, the outer diameter of metal cap 3 is larger than the diameter of aluminum wire round rod 2. However, the outer diameter of metal cap 3 may be equal to or smaller than the diameter of aluminum wire round rod 2. For example, by narrowing the tip of aluminum wire round rod 2 by trimming, a metal cap having a smaller outer diameter than the diameter of aluminum wire round rod 2 may be fitted to aluminum wire round rod 2. Furthermore, the diameter of aluminum wire round rod 2 may be reduced only in the joint portion between aluminum wire round rod 2 and the metal cap.

In the method of manufacturing lead wire 1, welding may be carried out prior to fitting.

Second Exemplary Embodiment

Since a second exemplary embodiment of the present invention is the same as the first exemplary embodiment except that a new step is added to the steps of manufacturing a lead wire in the first exemplary embodiment. The same reference numerals are given to the same portions and detailed description thereof is omitted and only the different parts are described with reference to drawings.

A method of manufacturing a lead wire in accordance with the second exemplary embodiment includes a joining step of joining metal cap 3 and aluminum wire round rod 2 to each other by heat treatment after the fitting step of fitting metal cap 3 to the end portion of aluminum wire round rod 2.

A welding step of welding end portion 3a of metal cap 3 and external terminal 4 to each other may be carried out before or after the joining step.

The joining step is carried out by heat treatment of metal cap 3 from the outer surface of metal cap 3 with a gas burner. The heat treatment may employ a method by using resistance heating, laser, and electromagnetic induction.

With this heat treatment, an alloy diffusion layer is formed between aluminum wire round rod 2 and metal cap 3, thus improving the joint strength. Since joining is carried out by heat treatment, shape defects occurring by excessive melting of metal cap 3 is prevented while the joint strength can be improved, by adjusting the thickness of metal cap 3.

Furthermore, by adjusting the range in which metal cap 3 covers the end portion of aluminum wire round rod 2, metal cap 3 can easily accommodate a metal melted at the joint portion between aluminum wire round rod 2 and metal cap 3. In the joint portion between metal cap 3 and external terminal 4, the occurrence of protruding shape defects such as burrs can be prevented.

Furthermore, it is preferable that metal cap 3 is made of a metal material having a higher melting point than aluminum. Such metal cap 3 exhibits an effect of preventing the alloy diffusion layer from being excessively melted by heat treatment as compared with aluminum wire round rod 2 and from causing shape defects.

As the metal having a higher melting point than aluminum, it is preferable to employ a metallic single substance of copper, nickel or iron, an alloy containing copper, nickel, or iron, or the like. Since these metals can form an alloy in a liquid phase state at not higher than a melting point of aluminum, an alloy diffusion layer is easily formed between aluminum wire round rod 2 and metal cap 3 by heat treatment. Also, an effect of improving the joint strength is exhibited. Furthermore, it is preferable that theses metals are provided inside metal cap 3 in order to facilitate the formation of an alloy diffusion layer. These metals may be provided as a base material of metal cap 3 or a plating layer.

According to the above-mentioned method of manufacturing a lead wire, while the joint strength between aluminum wire round rod 2 and external terminal 4 is secured, the occurrence of shape defect at the joint portion between aluminum wire round rod 2 and external terminal 4 can be suppressed. Thus, the effect of stabilizing the joining state is exhibited.

Third Exemplary Embodiment

Figure 1:
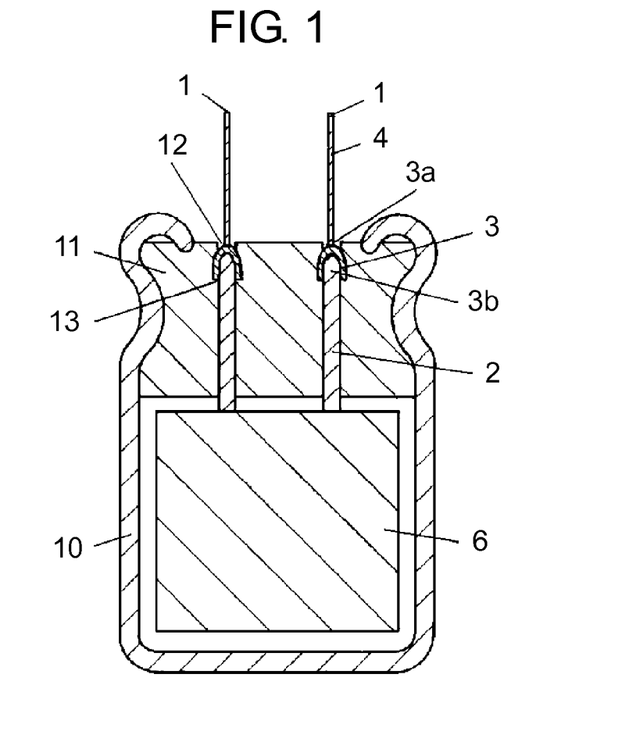
FIG. 1 is a sectional view showing a configuration of an electrolytic capacitor using lead wires in accordance with an exemplary embodiment of the present invention.

Next, a configuration of an electrolytic capacitor using a lead wire of the present invention is described. FIG. 1 is a sectional view showing a configuration of an electrolytic capacitor using a lead wire of the present invention, and FIG. 2 is a developed perspective view showing a capacitor element to which lead wire 1 is connected.

The electrolytic capacitor of the present invention includes capacitor element 6 having an anode foil and a cathode foil to which a pair of lead wires 1 connected respectively, exterior case 10 having a cylindrical shape with a bottom and accommodating capacitor element 6, and sealing member 11 for sealing an open end of exterior case 10. Sealing member 11 is provided with through-holes 12 each allowing lead wire 1 to pass through.

Figure 2:
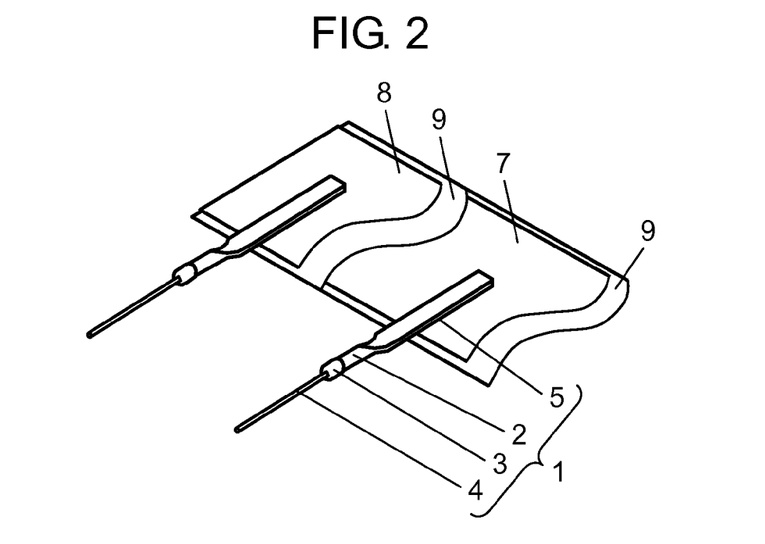
FIG. 2 is a developed perspective view showing a capacitor element to which lead wires are joined in accordance with an exemplary embodiment of the present invention.

In FIG. 2, lead wire 1 is manufactured by the manufacturing method in accordance with the first or second first exemplary embodiment. In other words, aluminum wire round rod 2 is fitted into metal cap 3, and external terminal 4 is joined to the outer surface of the end portion of metal cap 3. Furthermore, flat portion 5, which is processed in a flat shape, is provided at another end of aluminum wire round rod 2.

Flat portions 5 of lead wires 1 are connected to anode foil 7 and cathode foil 8, which are made of a valve action metal such as aluminum, respectively by ultrasonic welding or press-fitting. Furthermore, anode foil 7 and cathode foil 8 are wound with separator 9 interposed therebetween so as to produce capacitor element 6 of which a pair of lead wires 1 are led out.

In FIG. 1, exterior case 10 is made of metal such as aluminum and an aluminum alloy. Exterior case 10 accommodates capacitor element 6 and an electrolyte (not shown) such as a driving electrolytic solution and a solid electrolyte made of electroconductive polymer.

An open end of exterior case 10 is sealed with sealing member 11 made of an elastic body. Lead wire 1 passes through through-hole 12 in sealing member 11. Metal cap 3 is brought into contact with the inner surface of through-hole 12, and external terminal 4 protrudes from through-hole 12 and is exposed from sealing member 11.

Note here that through-hole 12 is sealed by allowing the diameter of through-hole 12 to be the same as or little bit smaller than the diameter of aluminum wire round rod 2.

Lead wire 1 of the present invention is inserted into through-hole 12 of sealing member 11 in a way in which external terminal 4 and aluminum wire round rod 2 are inserted sequentially in this order. At the time of insertion, in the present invention, since no shape defect is generated at the joint portion between aluminum wire round rod 2 and external terminal 4, abrasion does not easily occur in through-hole 12, thus enabling the generation of gap between lead wire 1 and through-hole 12 to be suppressed. Thus, leakage of the driving electrolytic solution and the like does not easily occur. Consequently, the reliability of an electrolytic capacitor can be improved.

Furthermore, as to the shape of metal cap 3, as shown in FIGS. 1 and 3, it is preferable that the entire or a part of the outer peripheral portion of the metal cap has a curved surface in which the outer diameter is increased along the direction from the end portion 3a side to the opening 3b side of metal cap 3. An example of the shape may include a dome shape, a cone shape, a truncated cone shape, and the like. Metal cap 3 may have any shapes as long as it has a curved surface at least in a portion that is brought into contact with the inner surface of through-hole 12 when lead wire 1 is inserted into through-hole 12. The tip of the outer surface of end portion 3a may be flat.

With such a curved surface, it is possible to reduce load applied to lead wire 1 when lead wire 1 is inserted into through-hole 12 of sealing member 11. This can prevent deformation of anode foil 7 and cathode foil 8 of capacitor element 6 caused by the deformation of lead wire 1 or displacement of insertion of a pair of lead wires 1. Thus, an effect of improving the leakage current characteristics of the electrolytic capacitor is exhibited.

Furthermore, as shown in FIG. 1, lead wire 1 may be provided with stepped portion 13 so that opening 3b of metal cap 3 is larger than the diameter of aluminum wire round rod 2 at a portion to be inserted into through-hole 12 in sealing member 11. As shown in FIG. 1, stepped portion 13 is formed by a thickness of the material of the metal cap. Furthermore, stepped portion 13 may be provided on the end surface of metal cap 3 at the opening 3b side by making the outer diameter of the opening 3b side of metal cap 3 larger than the diameter of aluminum wire round rod 2. For example, a plurality of steps like a stairway (not shown) may be provided.

With stepped portion 13, stepped portion 13 between metal cap 3 and aluminum wire round rod 2 can be engaged with through-hole 12 strongly. This can prevent deformation of anode foil 7 or cathode foil 8 of capacitor element 6 caused by displacement of lead wire 1 toward the inside of exterior case 10. Thus, an effect of improving the leakage current characteristic of the electrolytic capacitor is exhibited.

Fourth Exemplary Embodiment

Figure 4:
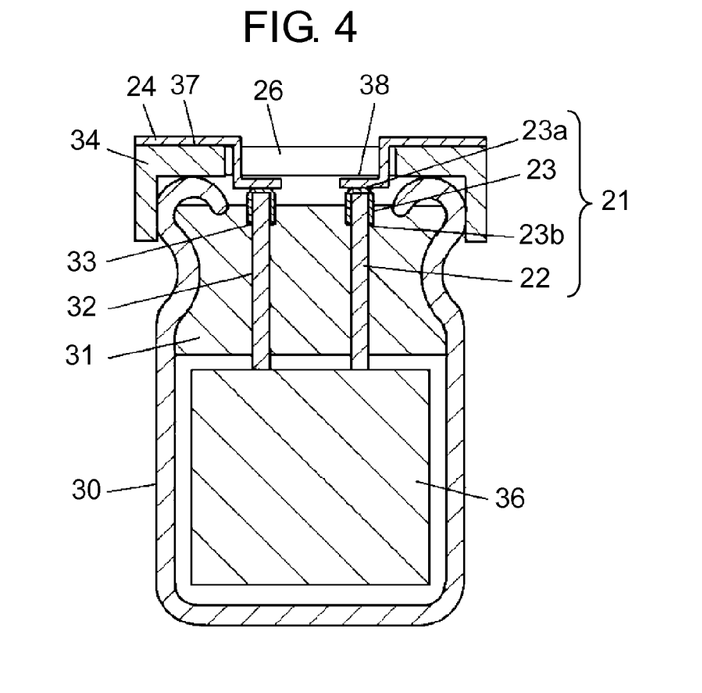
FIG. 4 is a sectional view showing a configuration of an electrolytic capacitor in accordance with an exemplary embodiment of the present invention.
Figure 5:
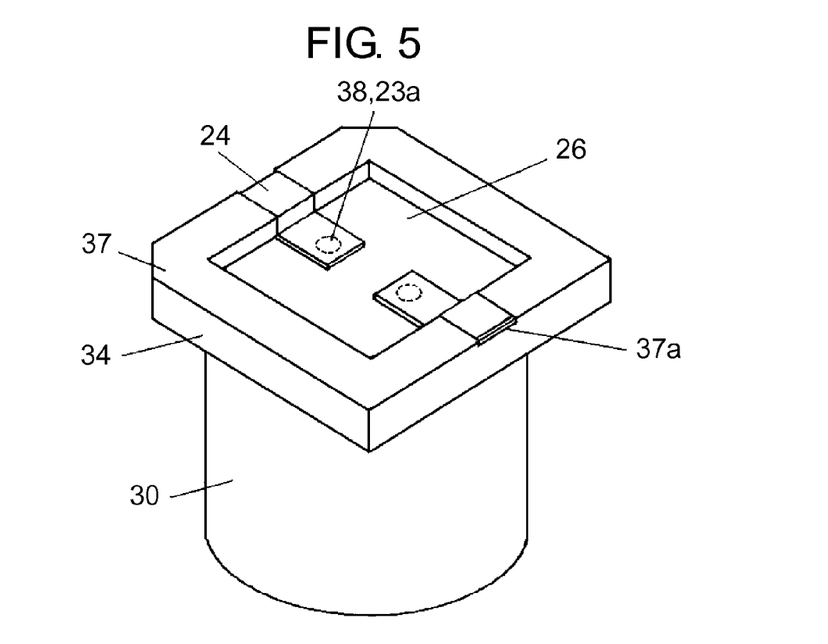
FIG. 5 is a perspective bottom view showing an electrolytic capacitor in accordance with an exemplary embodiment of the present invention.
Figure 6:
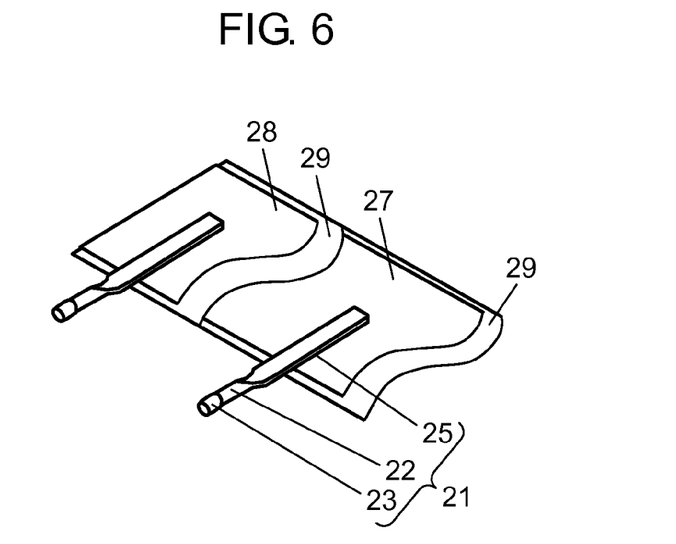
FIG. 6 is a developed perspective view showing a capacitor element in accordance with an exemplary embodiment of the present invention.
Figure 8A:
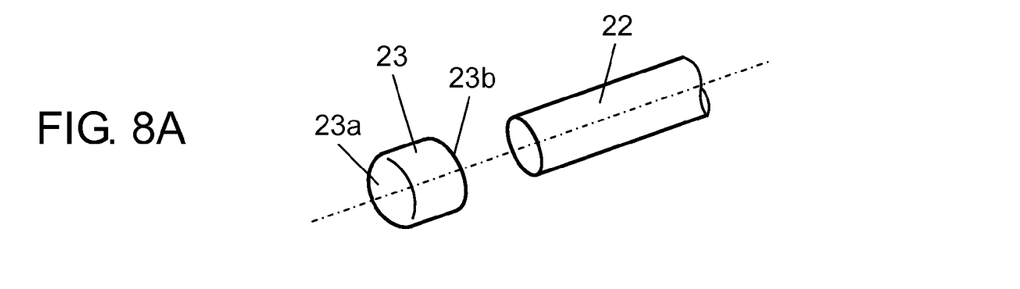
FIG. 8A is a perspective view showing a step of a joining method of the lead wire in accordance with another exemplary embodiment of the present invention.
Figure 8B:
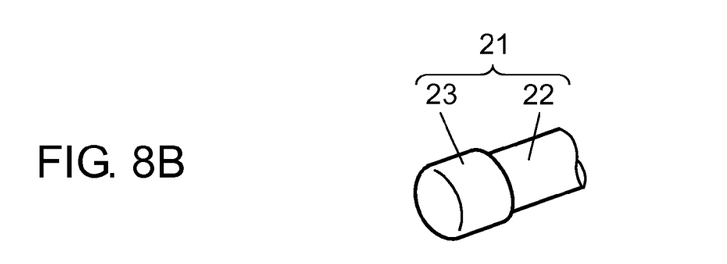
FIG. 8B is a perspective view showing a step of a joining method of the lead wire in accordance with another exemplary embodiment of the present invention.

Next, an electrolytic capacitor using another lead wire of the present invention is described. FIG. 4 is a sectional view showing a configuration of an electrolytic capacitor in accordance with a fourth exemplary embodiment of the present invention. FIG. 5 is a perspective bottom view thereof. FIG. 6 is a developed perspective view showing a capacitor element thereof. FIGS. 8A and 8B are perspective views showing steps of a joining method of another lead wire in accordance with the present invention.

Also in the lead wire of the present invention, a metal cap having a concave-shaped cross section is fitted to the end portion of an aluminum wire round rod similar to the first to third exemplary embodiments.

Firstly, a method of manufacturing lead wire 21 of the present invention is described with reference to FIGS. 8A and 8B.

In FIG. 8A, metal cap 23 is formed by press-working of a metal plate into a cylindrical shape having opening 23b on one end and flat closed end portion 23a on another end and having a concave-shaped cross section in the direction of the axis linking opening 23b and end portion 23a.

Next, as shown in FIG. 8B, metal cap 23 is fitted to an end portion of aluminum wire round rod 22 so as to form lead wire 21.

Furthermore, the end portion of aluminum wire round rod 22 is trimmed by press-working, tumbling, or the like so that the end portion is engaged in the inner periphery of metal cap 23, and then metal cap 23 may be fitted thereto.

Furthermore, aluminum wire round rod 22 and metal cap 23 may be joined to each other by subjecting a fitted portion between aluminum wire round rod 22 and metal cap 23 to heat treatment.

This heat treatment can be carried out by heating metal cap 23 from the outer surface of metal cap 23 with a gas burner. With the heat treatment, an alloy diffusion layer is formed between aluminum wire round rod 22 and metal cap 23. Thus, an effect of improving the joint strength is exhibited. Furthermore, the heat treatment may be carried out by a method using resistance heating, laser, or electromagnetic induction.

Furthermore, by appropriately increasing the range in which metal cap 23 covers the end portion of aluminum wire round rod 22, metal cap 23 can easily accommodate a metal melted at the joint portion between aluminum wire round rod 22 and metal cap 23. Thus, it is possible to suppress the occurrence of protruding shape defects such as burrs.

Furthermore, in metal cap 23, adjusting the thickness of metal cap 23 can allows the joint portion to melt without excessively melting the outer surface of metal cap 23, thus preventing the occurrence of protruding shape defects such as burrs.

Furthermore, it is preferable that the thicknesses of a columnar side surface of metal cap 23 to be heat treated or of end portion 23a are uniform in order that the joint portion is melted uniformly.

Furthermore, it is preferable that metal cap 23 is made of a metallic material having a higher melting point than aluminum. Metal cap 23 thus made exhibits an effect of preventing the alloy diffusion layer from being excessively melted by the heat treatment as compared with the end portion of aluminum wire round rod 22 and from causing shape defects.

Furthermore, it is preferable that the metal having a higher melting point than aluminum includes a metallic single substance of copper, nickel or iron, an alloy containing copper, nickel, or iron, and the like. Since these metals can form an alloy in a liquid phase state at a temperature of not higher than a melting point of aluminum, an alloy diffusion layer is easily formed between aluminum wire round rod 22 and metal cap 23 by heat treatment. An effect of improving the joint strength is further exhibited. Furthermore, it is preferable that these metals are provided inside metal cap 23 in order to facilitate the formation of an alloy diffusion layer. These metals may be provided as a base material of metal cap 23 or a plating layer.

Next, an electrolytic capacitor in accordance with the fourth exemplary embodiment using lead wire 21 of the present invention is described.

In FIG. 6, lead wire 21 is provided with flat portion 25 that is processed in a flat shape at an end portion opposite to an end of aluminum wire round rod 22 to which metal cap 23 is fitted.

Flat portions 25 of lead wires 21 are respectively connected to anode foil 27 and cathode foil 28, which are made of a valve action metal such as aluminum by ultrasonic welding or press-fitting. Furthermore, anode foil 27 and cathode foil 28 are wound with separator 29 interposed therebetween so as to produce capacitor element 36 of which a pair of lead wires 21 are led out.

As shown in FIG. 4, exterior case 30 is made of metal such as aluminum and an aluminum alloy. Exterior case 30 accommodates capacitor element 36 and an electrolyte (not shown) such as a driving electrolytic solution and a solid electrolyte made of electroconductive polymer.

An open end of exterior case 30 is sealed with sealing member 31, and each lead wire 21 passes through throughhole 32 of sealing member 31. Metal cap 23 is brought into contact with the inner surface of through-hole 32 at the open end side of exterior case 30, protrudes from through-hole 32 and is exposed from sealing member 31.

Through-hole 32 is sealed by allowing the diameter of through-hole 32 to be the same as or little bit smaller than the diameter of aluminum wire round rod 22.

The capacitor includes insulating member 34 that is brought into contact with the open end of exterior case 30. A pair of plate-shaped external terminals 24 disposed along flat-shaped bottom surface 37 of insulating member 34 pass through through-holes 26 provided in insulating member 34 and are joined to the outer surface of the exposed end portion of metal cap 23.

As shown in FIG. 5, external terminal 24, which is accommodated along groove 37a provided on bottom surface 37 of insulating member 34, bends in the direction in which it passes through through-hole 26 in insulating member 34, further bends in parallel to bottom surface 37 of insulating member 34, and is joined to end portion 23a of metal cap 23.

External terminal 24 is a plate or a wire made of a metallic material other than aluminum. An example of the metallic material includes an elemental substance of iron, nickel, or copper, an iron alloy, a nickel alloy, a copper alloy, and the like. Furthermore, external terminal 24 may be provided with a plating layer. As the plating layer, for example, tin plating can be used in order to be connected to a circuit board. Tin plating includes a tin (Sn) elemental substance, an alloy of tin with Ag, Bi, In, Pb and the like added.

Insulating member 34 is formed of thermoplastic resin such as polyethylene, polypropylene, polyethylene terephthalate, and liquid crystal polymer, or a thermosetting material such as phenol resin and epoxy resin.

As shown in FIG. 5, pair of external terminals 24 pass through through-hole 26 of insulating member 34. However, a plurality of through-holes allowing each of external terminals 24 to pass through may be provided.

Next, a method of manufacturing an electrolytic capacitor in accordance with the fourth exemplary embodiment is described.

Firstly, each lead wire 21 coupled to capacitor element 36 is inserted into through-hole 32 in a way in which metal cap 23 and aluminum wire round rod 22 are inserted sequentially in this order. Then, metal cap 23 is exposed from sealing member 31. Thereafter, exterior case 30 is allowed to accommodate capacitor element 36 and a driving electrolytic solution, and exterior case 30 is caulked with respect to sealing member 31 so as to seal the open end of exterior case 30.

Next, insulating member 34 is brought into contact with the open end of exterior case 30, and each external terminal 24 is disposed on bottom surface 37 of insulating member 34 while it is connected to the top of the exposed portion of metal cap 23.

Furthermore, joint portion 38 of external terminal 24 is irradiated with laser beam from the direction perpendicular or oblique with respect to bottom surface 37 of insulating member 34 via through-hole 26, so that external terminal 24 and metal cap 23 are joined to each other by laser welding.

As mentioned above, since external terminal 24 is coupled to aluminum wire round rod 22 via metal cap 23, metal cap 23 can employ a metal material capable of easily welding with external terminal 24. For example, when external terminal 24 and metal cap 23 are joined to each other by laser welding, it is possible to prevent the occurrence of shape defect in which, for example, joint portion 38 is excessively melted and the joint area is reduced, by selecting metal cap 23 in consideration of the melting point of constituting materials, the thermal conductivity, or the like. Thus, the joint strength with respect to lead wire 21 can be stabilized and an electrolytic capacitor that is excellent in resistance to vibration can be achieved.

Furthermore, since the range in which metal cap 23 covers the end portion of aluminum wire round rod 22 can be adjusted, and metal cap 23 is selected in consideration of the material property such as a melting point of metal cap 23, a metal melted at the joint portion between aluminum wire round rod 22 and metal cap 23 can be accommodated in metal cap 23 easily when external terminal 24 is welded to lead wire 21. Thus, occurrence of protruding shape defect such as a burr can be prevented. This can prevent lead wires 21 from being displaced at the time of welding, and can dispose a pair of external terminals 24 along bottom surface 37 of insulating member 34 on the same surface. Thus, an electrolytic capacitor that is excellent in the mounting property can be achieved.

Furthermore, as to the shape of metal cap 23, it is preferable that the entire or a part of the outer peripheral portion of metal cap 23 has a curved surface in which the outer diameter is increased along the direction from the end portion 23a side to the opening 23b side of metal cap 23. Metal cap 23 may have any shapes as long as it has a curved surface at least in a portion that is brought into contact with the inner surface of through-hole 32 when lead wire 21 is inserted into through-hole 32.

The curved surface may be provided by round-chamfering a corner portion linking from a columnar side surface of metal cap 23 to end portion 23a as shown in FIG. 8A, or may be provided by forming metal cap 23 into, for example, a dome shape, a cone shape, and a truncated cone shape.

With such a curved surface, it is possible to reduce dynamical load applied to lead wire 21 when lead wire 21 is inserted into through-hole 32 of sealing member 31. This can prevent deformation of anode foil 27 and cathode foil 28 of capacitor element 36 caused by the deformation of lead wire 21 or displacement of insertion of a pair of lead wires 21. Thus, an effect of improving the leakage current characteristics of an electrolytic capacitor is exhibited.

Furthermore, as shown in FIG. 4, lead wire 21 may be provided with stepped portion 33 so that opening 23b of metal cap 23 is larger than the diameter of aluminum wire round rod 2 at a portion to be inserted into through-hole 32 in sealing member 31. Stepped portion 33 can be formed by a thickness of the material of metal cap 23. Furthermore, stepped portion 33 may be provided on the end surface of metal cap 23 at the opening 23b side by making the outer diameter of the opening 23b side of metal cap 23 larger than the diameter of aluminum wire round rod 22. The stepped portion may be, for example, a plurality of steps like stairs (not shown) may be provided.

With such stepped portion 33, metal cap 23 can be strongly engaged with through-hole 32. Joint portion 38 between lead wire 21 and external terminal 24 can be connected to sealing member 31 more strongly. Thus, the deformation of joint portion 38 can be reduced and furthermore, an electrolytic capacitor that is excellent in resistance to vibration can be achieved.

Fifth Exemplary Embodiment

A fifth exemplary embodiment is the same as the fourth exemplary embodiment except that the junction between an external terminal and a metal cap is different. Therefore, the same reference numerals are given to the same portions and detailed description thereof is omitted and only the different parts are described with reference to drawings.

Figure 7:
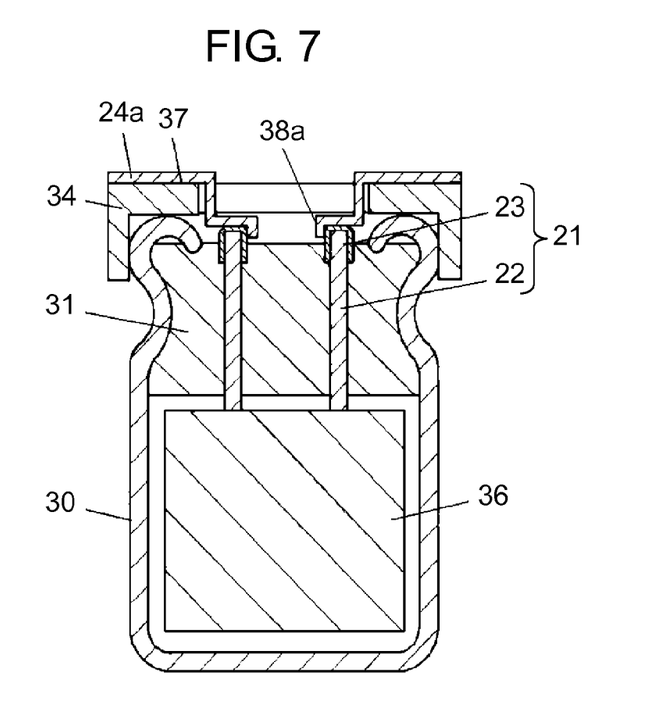
FIG. 7 is a sectional view showing a configuration of an electrolytic capacitor in accordance with an exemplary embodiment of the present invention.

FIG. 7 is a sectional view showing a configuration of an electrolytic capacitor in accordance with the fifth exemplary embodiment of the present invention. As shown in FIG. 7, a tip portion of external terminal 24a joined to lead wire 21 bends perpendicular or oblique with respect to bottom surface 37 of insulating member 34, and joined to metal cap 23 at joint portion 38a of the side surface or the curved surface of the exposed metal cap 23.

Thus, even if the height of metal cap 23 protruding from sealing member 31 varies, a pair of external terminals 24a along bottom surface 37 of insulating member 34 can be disposed on the same surface while external terminal 24a and metal cap 23 are joined reliably. Thus, an electrolytic capacitor that is excellent in the resistance to vibration and the mounting property can be achieved.

Sixth Exemplary Embodiment

Figure 9:
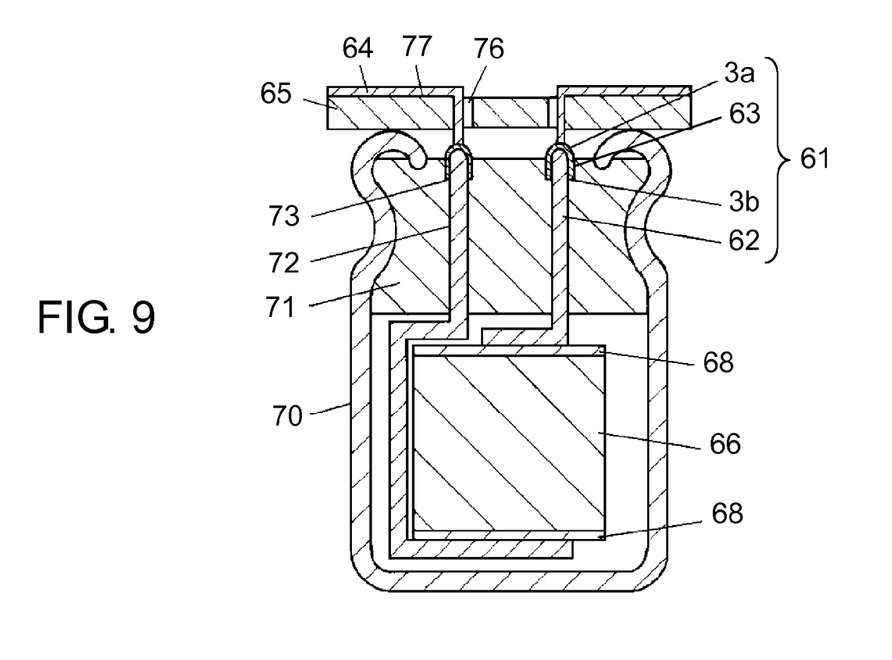
FIG. 9 is a sectional view showing a configuration of a film capacitor in accordance with an exemplary embodiment of the present invention.
Figure 10:
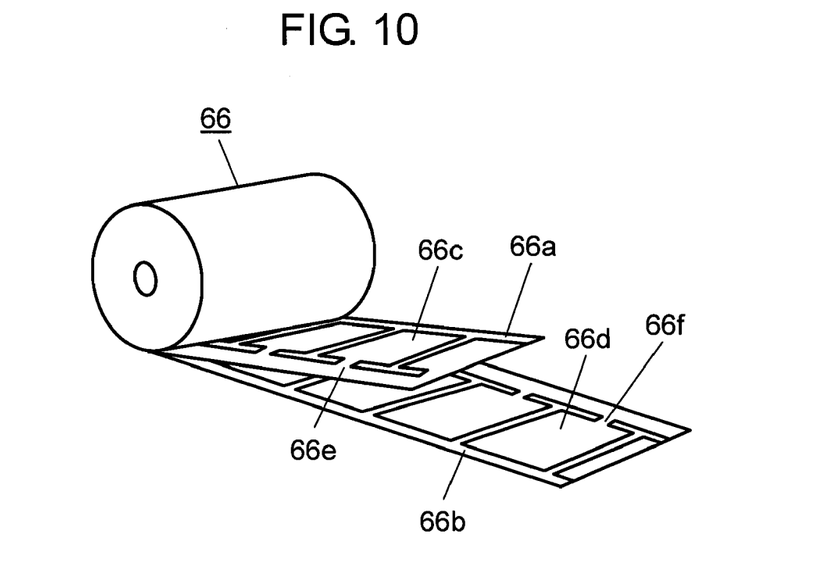
FIG. 10 is a developed perspective view showing a capacitor element of a film capacitor in accordance with an exemplary embodiment of the present invention.

A sixth exemplary embodiment relates to a film capacitor using a lead wire of the present invention. FIG. 9 is a sectional view showing a configuration of a film capacitor using the lead wire of the present invention, and FIG. 10 is a developed perspective view showing a capacitor element thereof.

As shown in FIG. 9, in lead wire 61, external terminal 64 and aluminum wire round rod 62 are coupled to each other via a metal cap having a concave-shaped cross section.

Aluminum wire round rod 62 and metal cap 63 form lead wire 61 together with external terminal 64. Since the manufacturing method thereof is similar to that for a configuration, that is, aluminum wire round rod 2, metal cap 3, and external terminal 4, of lead wire 1, of the first exemplary embodiment shown in FIG. 3, the detailed description is omitted.

Furthermore, similar to the second exemplary embodiment, a fitted portion between aluminum wire round rod 62 and metal cap 63 may be joined by heat treatment of metal cap 63 by using a gas burner, resistance heating, laser, or electromagnetic induction. With this heat treatment, an alloy diffusion layer is formed between aluminum wire round rod 62 and metal cap 63, thus exhibiting an effect of improving the joint strength.

Furthermore, similar to the second exemplary embodiment, it is preferable that metal cap 63 includes a metal having a higher melting point than aluminum. Metal cap 63 has an effect of preventing the alloy diffusion layer from being melted excessively due to the heat treatment as compared with the end portion of aluminum wire round rod 62 and preventing shape defects.

Next, a film capacitor of the sixth exemplary embodiment is described. As shown in FIG. 10, capacitor element 66 includes a pair of metalized films including margin portions 66a and 66b as a non vapor-deposited portion and vapor deposition electrodes 66c and 66d produced by vapor depositing a metal such as aluminum on the surface of a derivative film made of any of polyethylene terephthalate, polypropylene, polyethylene naphthalate, and polyphenylene sulfide.

Vapor deposition electrodes 66c and 66d of one of the metalized film are provided with fuses 66e and 66f having a self safety function allowing electrically shut down by scattering the vapor deposited portion when an abnormal current flows.

A pair of metalized films are combined so that vapor deposition electrodes 66c and 66d are disposed via a derivative film and margin portion 66a of one metalized film faces margin portion 66b of another metalized film. They are wound in a columnar shape so as to produce capacitor element 66.

Alternatively, a laminated capacitor element can be produced by laminating a pair of metalized films.

As shown in FIG. 9, a pair of collector electrodes 68 are provided on respective end surfaces of the wound body of capacitor element 66 by thermal spraying of melted metal such as aluminum, tin, and copper.

A pair of aluminum wire round rods 62 bend and are joined to collector electrodes 68 on both end surfaces of capacitor element 66 by spot welding. The metal cap 63 sides of the pair of aluminum wire round rods 62 are led out to one end surface side of capacitor element 66 as a pair.

Exterior case 70 is made of a metal such as aluminum and an aluminum alloy. Exterior case 70 includes gap between the outer surface of capacitor element 66 and the inner surface of the exterior case. Capacitor element 66 is accommodated in exterior case 70 with both end surfaces disposed at an open end and a bottom end.

An open end of exterior case 70 is sealed with sealing member 71 made of an elastic body. Each lead wire 61 passes through through-hole 72 of sealing member 71. Metal cap 63 is brought into contact with the inner surface of through-hole 72 at the open end side and exposed from sealing member 71.

Stepped portion 73 is engaged into the inner surface of through-hole 72 of exterior case 70. Stepped portion 73 is provided in opening 3b of metal cap 63 so as to be larger than the diameter of aluminum wire round rod 62 by using a material thickness of metal cap 63.

Note here that through-hole 72 is sealed by allowing the diameter of through-hole 72 to be the same as or little bit smaller than the diameter of aluminum wire round rod 62.

Furthermore, the capacitor includes insulating member 65 that is brought into contact with the open end of exterior case 70. A pair of external terminals 64 disposed along flat-shaped bottom surface 77 of insulating member 65 are bent so that they are allowed to pass through through-holes 76 provided in insulating member 65, and joined to the outer surface of exposed end portion 3a of metal 63.

External terminal 64 is a wire or a plate of a metallic material including an elemental substance of iron, nickel, or copper, an iron alloy, a nickel alloy, a copper alloy, and the like. External terminal 64 may be provided with a plating layer to be coupled to a circuit board.

Insulating member 65 is formed of thermoplastic resin such as polyethylene, polypropylene, polyethylene terephthalate, and liquid crystal polymer, or a thermosetting material such as phenol resin, and epoxy resin.

In the method of manufacturing a film capacitor in accordance with the sixth exemplary embodiment, lead wire 61 and external terminal 64 are attached to collector electrode 68 formed on capacitor element 66. Next, external terminal 64 and aluminum wire round rod 62 are inserted into through-hole 72 of sealing member 71 sequentially in this order, and metal cap 63 is exposed from sealing member 71. Thereafter, exterior case 70 is allowed to accommodate capacitor element 66, and exterior case 70 is caulked with respect to sealing member 71, thereby sealing the open end of exterior case 70.

Next, the tip of each external terminal 64 protruding from sealing member 71 is processed into a flat shape. Then, while the tip of external terminal 64 is allowed to pass through through-hole 76 of insulating member 65, insulating member 65 is brought into contact with the open end of exterior case 70. Furthermore, the tip of external terminal 64 is bent and disposed along bottom surface 77 of insulating member 65.

As mentioned above, aluminum wire round rod 62 and external terminal 64 are joined to each other via metal cap 63, thereby enabling the joint strength between aluminum wire round rod 62 and external terminal 64 to be stabilized. A film capacitor that is excellent in resistance to vibration can be achieved.

Furthermore, when the open end of exterior case 70 is sealed, the pressure inside exterior case 70 may be made to be lower than the normal pressure. Thereby, when a capacitor is mounted, high temperature heat such as reflow is conducted less easily. Thus, it is possible to prevent capacitor element 66 from being excessively heated and the capacitance from reducing. Thus, a film capacitor having excellent reliability can be achieved.

Since no shape defect is generated at the joint portion between aluminum wire round rod 62 and external terminal 64, abrasion does not easily occur in through-hole 72 when lead wire 61 is inserted into sealing member 71, thus preventing the generation of gap between lead wire 61 and through-hole 72. Therefore, the change in the reduced pressure inside exterior case 70 can be reduced, and thus exhibiting an effect of improving reliability of a film capacitor.

Hereinafter, data of the specifically obtained results are described.

Example A

With reference to FIG. 1, for aluminum wire round rod 2, an aluminum wire having a diameter of 1.3 mm and a purity of 99.99% is used.

Metal cap 3 is formed into a shape having a dimension of a maximum outer diameter of 1.6 mm, an inner diameter of 1.30 mm, and a length of 0.8 to 1.0 mm by press working an iron-base plate material. The opening 3b side of metal cap 3 is a columnar shape. The end portion 3a side of metal cap 3 has a dome shape having a curved surface with a radius of about 0.4 to 1.0 mm at the outer periphery. The top of the dome shape is provided with a circular flat portion with a diameter of about 0.3 to 1.0 mm. Furthermore, the surface of metal cap 3 is provided with a nickel plating layer having a thickness of 2 to 10 μm.

Firstly, the end portion of aluminum wire round rod 2 is trimmed, and metal cap 3 is fitted thereto. Then, the entire outer periphery of metal cap 3 is heated with a gas burner, so that the temperature of metal cap 3 is around the melting point of aluminum. Thus, metal cap 3 is joined to aluminum wire round rod 2.

After cooling, external terminal 4 of the copper clad tin-plating iron wire having a diameter of 0.6 mm is pressed and joined to end portion 3a of metal cap 3 with resistance welding. Lead wire 1 is thus produced with stepped portion 13 whose height is about 0.15 mm rising outward to the outer periphery of aluminum wire round rod 2 by using the thickness of metal cap 3.

Comparative Example A

In Comparative Example A, a lead wire is produced by using the same aluminum wire round rod and the external terminal as in Example A, and the aluminum wire round rod and the external terminal are directly joined to each other by arc welding according to a conventional technology.

Each one thousand pieces of the lead wires in accordance with Example A and Comparative Example A are extracted and examined for appearance defects at the joint portion between the aluminum wire round rod and the external terminal and for insufficient tensile strength of the lead wires. The comparison data are shown in Table 1.

TABLE 1

| Sample | Appearance check | | Tensile strength test | |
|---|---|---|---|---|
| | Number of samples (pieces) | Number of appearance defects (pieces) | Number of samples (pieces) | Number of insufficient tensile strength (pieces) |
| Example A | 1000 | 0 | 1000 | 0 |
| Comparative Example A | 1000 | 16 | 1000 | 4 |

Some defects occur in Comparative Example A, but the number of defects in Example A is zero. As is apparent from Table 1, as compared with Comparative Example A, Example A can prevent the occurrence of shape defects at the joint portion while the joint strength between the aluminum wire round rod and the external terminal of lead wire is secured.

Example B

An electrolytic capacitor is produced by using lead wire 1 of Example A.

With reference FIGS. 1 and 2, firstly, aluminum foil is subjected to etching treatment and chemical treatment in an aqueous solution of ammonium borate so as to form an oxide film to form anode foil 7. On the other hand, an aluminum foil is subjected to etching treatment so as to form cathode foil 8.

Next, flat portion 5 is provided by processing an end portion of aluminum wire round rod 2 of lead wire 1 of Example A into a flat shape. Flat portions 5 are connected to anode foil 7 and cathode foil 8 by press-fitting. Furthermore, anode foil 7 and cathode foil 8 are wound with separator 9 made of Manila paper interposed therebetween so as to produce capacitor element 6.

Next, a pair of lead wires 1 led out of capacitor element 6 are allowed to pass through through-holes 12 provided in sealing member 11 made of mainly butyl rubber, opening 3b of metal cap 3 is placed in through-hole 12 in a manner that end portion 3a of metal cap 3 does not protrude from through-hole 12.

Capacitor element 6 is impregnated with a driving electrolytic solution and is then accommodated in aluminum exterior case 10 having a cylindrical shape with a bottom. Sealing member 11 is mounted on the opening of exterior case 10. Metal case 10 together with sealing member 11 is narrowed, thereby sealing the open portion of exterior case 10. Thus, a electrolytic capacitor of 6.3 V, 1500 µF from which a pair of external terminals 4 protrude is produced.

Comparative Example B

In Comparative Example B, a electrolytic capacitor of 6.3 V, 1500 µF is produced in the same manner as in Example B except that a conventional lead wire of Comparative Example A is used instead of the lead wire of Example A that used in Example B.

Reflow test at 240° C. or more of peak temperature for 10 seconds and a high temperature test with no load for 3000 hours are carried out with respect to 100 pieces each of electrolytic capacitor samples of Example B and Comparative Example B. The test results are shown in Tables 2 and 3, respectively. The measurement properties in Tables 2 and 3 include a change ratio in capacitance at the frequency of 120 Hz relative to the initial value, and average, maximum and minimum values of the leakage current value when the normal rated voltage 6.3 V is applied for one minute.

TABLE 2

| Sample | Property | | Initial value | After reflow test |
|---|---|---|---|---|
| Example B | leakage current (µA) | average value | 7.0 | 8.0 |
| | | maximum value | 7.3 | 8.4 |
| | | minimum value | 6.5 | 7.5 |
| | change ratio of capacitance (%) | average value | — | −2.2 |
| | | maximum value | — | −2.3 |
| | | minimum value | — | −2.0 |
| Comparative Example B | leakage current (µA) | average value | 9.0 | 110.3 |
| | | maximum value | 10.4 | 980.0 |
| | | minimum value | 8.6 | 9.5 |
| | change ratio of capacitance (%) | average value | — | −3.1 |
| | | maximum value | — | −3.9 |
| | | minimum value | — | −2.2 |

TABLE 3

| Sample | property | | Initial value | High temperature test with no load (3000 hrs) |
|---|---|---|---|---|
| Example B | leakage current (µA) | average value | 7.0 | 9.1 |
| | | maximum value | 7.6 | 9.4 |
| | | minimum value | 6.5 | 8.9 |
| | change ratio of capacitance (%) | average value | — | −16.8 |
| | | maximum value | — | −17.1 |
| | | minimum value | — | −15.9 |
| Comparative Example B | leakage current (µA) | average value | 9.0 | 9.9 |
| | | maximum value | 10.8 | 10.7 |
| | | minimum value | 8.5 | 9.3 |
| | change ratio of capacitance (%) | average value | — | −26.8 |
| | | maximum value | — | −56.4 |
| | | minimum value | — | −24.7 |

As compared with Comparative Example B, in Example B, the change in leakage current after reflow test is extremely small as shown in Table 2, and the change ratio of capacitance after high temperature test with no load can be reduced as shown in Table 3. Therefore, the reliability of an electrolytic capacitor can be improved.

As mentioned above, by using a capacitor lead wire to which a metal cap having a concave-shaped cross section to be joined to an external terminal is fitted to the end portion of the aluminum wire round rod, a capacitor having high reliability can be obtained. As described in the above-mentioned exemplary embodiments, the external terminal may have a circular cross section or a quadrangle cross section. The cross sectional shape of the aluminum wire round rod may not necessarily be circular. Even if the cross sectional shape may be quadrangle or ellipse, an effect of improving the reliability can be provided. However, from the viewpoint of easiness of processing or assembly and sealing performance, the shape having a circular cross section is suitable.

INDUSTRIAL APPLICABILITY

A capacitor lead wire and a method of manufacturing the same, as well as a capacitor using the lead wire in accordance with the present invention are characterized in that a metal cap fitted to an end portion of an aluminum wire round rod is provided. In particular, they can be applied to a capacitor that requires reliability.

The invention claimed is:

1. A capacitor comprising:
   a lead wire including
      an aluminum wire round rod,
      a metal cap having a concave-shaped cross section, an opening, and a dome-shaped end portion, the dome-shaped end portion and the opening being at opposite ends of the metal cap, the opening being fitted to an end portion of the aluminum wire round rod, wherein an outer diameter of a curved surface which forms the dome-shaped end portion increases along a direction from the dome-shaped end portion toward the opening, the outer diameter being a smallest outer diameter at the dome-shaped end portion, and being a largest outer diameter at an end provided with the opening;
      an alloy diffusion layer between the aluminum wire round rod and the metal cap, the alloy diffusion layer joining the aluminum wire round rod and the metal cap, and
      an external terminal joined to the metal cap on an outer surface at the dome-shaped end portion;
   a capacitor element coupled to the aluminum wire round rod of the lead wire;
   an exterior case having a cylindrical shape with a bottom and accommodating the capacitor element; and
   a sealing member provided with a through-hole allowing the lead wire to pass through and sealing an open end of the exterior case,
   wherein the external terminal of the lead wire protrudes from the through-hole in the sealing member.

2. The capacitor according to claim 1, wherein the metal cap is formed of a metal having a higher melting point than aluminum.

3. A method of manufacturing a lead wire for a capacitor, the method comprising:
   fitting an opening of a metal cap having a concave-shaped cross section to an end portion of an aluminum wire round rod, the metal cap having a curved surface in which an outer diameter of the curved surface increases along a direction from a dome-shaped end portion toward the opening, the dome-shaped end portion and the opening being at opposite ends of the metal cap, the outer diameter being a smallest outer diameter at the dome-shaped end portion, and being a largest outer diameter at an end provided with the opening;
   joining the metal cap and the aluminum wire round rod to each other by heat treatment; and
   welding an outer surface of the dome-shaped end portion of the metal cap and an external terminal to each other.

4. The method of manufacturing a capacitor lead wire according to claim 3, wherein the metal cap is formed of a metal having a higher melting point than aluminum.

5. A lead wire for a capacitor, comprising:
   an aluminum wire round rod;
   a metal cap having a concave-shaped cross section, an opening, and a dome-shaped end portion, the dome-shaped end portion and the opening being at opposite ends of the metal cap, the opening being fitted to an end portion of the aluminum wire round rod, wherein an outer diameter of a curved surface which forms the dome-shaped end portion increases along a direction from the dome-shaped end portion toward the opening, the outer diameter being a smallest outer diameter at the dome-shaped end portion, and being a largest outer diameter at an end provided with the opening;
   an alloy diffusion layer between the aluminum wire round rod and the metal cap, the alloy diffusion layer joining the aluminum wire round rod and the metal cap; and
   an external terminal joined to the metal cap on an outer surface at the dome-shaped end portion.

6. The lead wire for a capacitor according to claim 5, wherein the metal cap is formed of a metal having a higher melting point than aluminum.

* * * * *

UNITED STATES PATENT AND TRADEMARK OFFICE
CERTIFICATE OF CORRECTION

| | | |
|---|---|---|
| PATENT NO. | : 8,184,429 B2 | |
| APPLICATION NO. | : 12/375257 | |
| DATED | : May 22, 2012 | |
| INVENTOR(S) | : Junji Yamane et al. | |

It is certified that error appears in the above-identified patent and that said Letters Patent is hereby corrected as shown below:

On the Title Page

In Section (57) Abstract, line 11, "portion opposite to the opining." should read --portion opposite to the opening.--

Signed and Sealed this
Eleventh Day of September, 2012

David J. Kappos
*Director of the United States Patent and Trademark Office*